Figure 1:
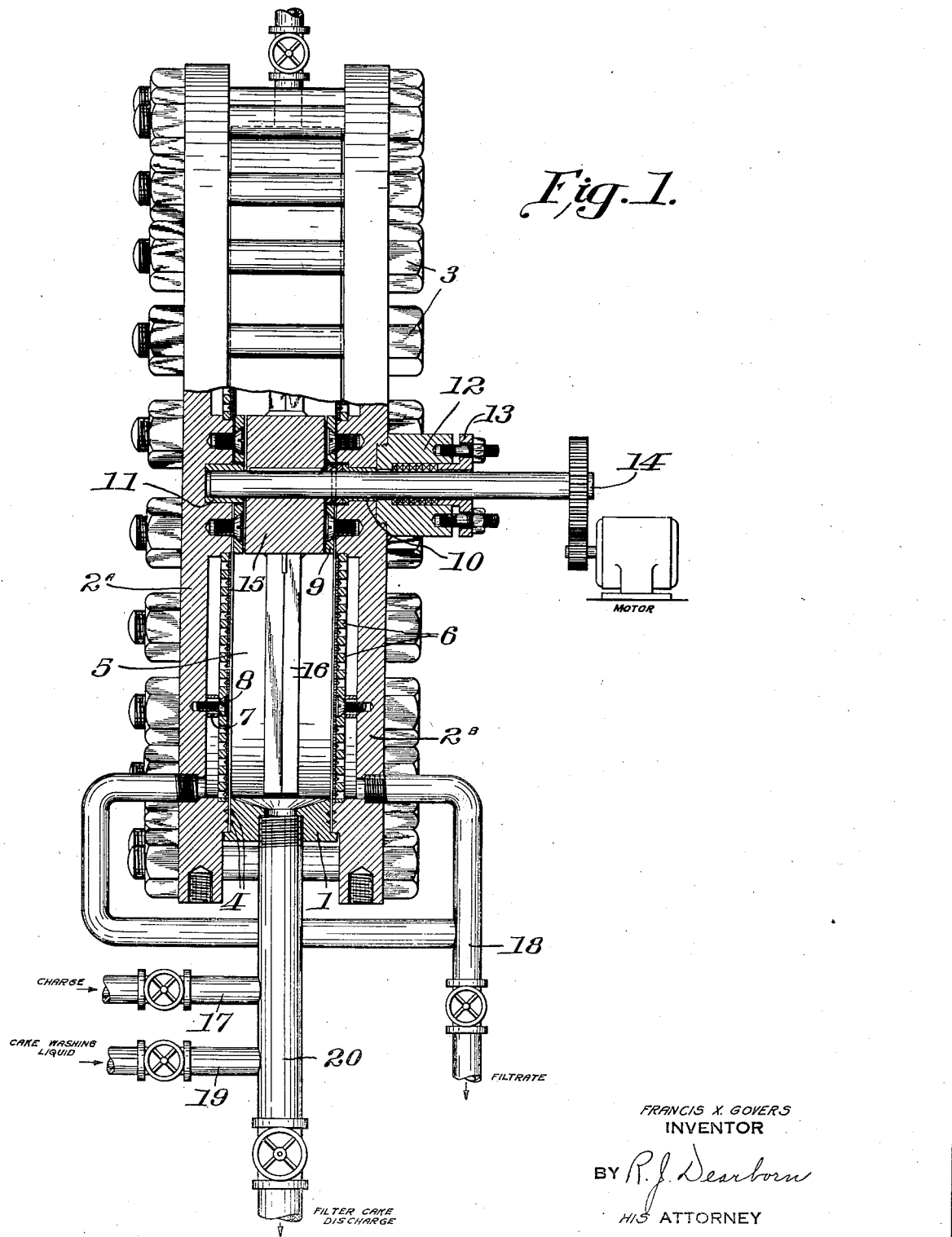

June 4, 1935.  F. X. GOVERS  2,003,664
FILTRATION OF WAX FROM OIL
Filed Jan. 11, 1932  2 Sheets-Sheet 2

FRANCIS X. GOVERS
INVENTOR
BY R. J. Dearborn
HIS ATTORNEY

Patented June 4, 1935

2,003,664

UNITED STATES PATENT OFFICE 2,003,664

FILTRATION OF WAX FROM OIL

Francis X. Govers, Vincennes, Ind., assignor to Indian Refining Company, Lawrenceville, Ill., a corporation of Maine Application January 11, 1932, Serial No. 585,844

2 Claims. (Cl. 196—19)

This invention relates to a method of and apparatus for filtering or separting solids from liquids and particularly wherein a mass of separated and suspended solids may be washed or extracted with a solvent to remove soluble constituents.

My invention contemplates an improved method of separation of solids from liquids by filtration in a leaf-type filter provided with internal stirring means for maintaining an even mixture while undergoing filtration in the filter in a suitable condition of turbulence, which is productive of rapid filtration and uniform deposition of the solids in the form of a homogeneous filter cake. It also provides a method for supplying solvent wash to the face of a filter cake while maintaining a suitable condition of turbulence productive of rapid washing and uniform distribution of solvent throughout the mass of material to be washed.

An important feature of my invention is this provision of stirring arms within the filter means adaptable for effecting the rapid and easy discharge of the filter cake in the form of a slurry from the filtering means without the necessity of opening the filter.

The apparatus of my invention is adapted to the filtration of mixtures containing solid or semi-solid material or precipitates of jelly-like consistency which lack what are generally referred to as free-filtering qualities and which, as deposited, are difficult to filter out of the mother liquor. This condition is particularly noticeable in certain salts or compounds of alumina, and in certain precipitations produced by chilling a solution of petroleum hydrocarbon in a selective solvent. The invention is particularly well adapted to the removal of paraffin wax from chilled solutions of wax-bearing oil in suitable solvent liquids.

In the purification of many chemicals as, for example, aluminum hydroxide, Blanc Fixe or barium sulphate, etc., the purification frequently has to be of a very high degree and difficulty is found in washing from the precipitated solids the mother liquor and salts of reaction.

Ordinarily the salts of reaction distributed throughout a precipitated mass of material are removed by washing with a solvent while stirring, settling the washed precipitate and decanting the liquid layer. This process is repeated until the salts of reaction are practically eliminated. This is tedious, and in the case of flocculent precipitates which settle with difficulty a great amount of time is consumed and, in additon, the removal of the salts of reaction may never be complete.

In the forming of precipitates or crystals of chemical compounds, it is very difficult to form precipitates wherein all portions of the precipitate are of even size, and it is still more difficult to obtain crystals of uniform size. Due to this lack of uniformity, it is very difficult to obtain a deposit which is comparatively uniform in deposition, either upon the walls of a centrifuge or upon the surface of a filtering medium and due to this uneven deposition it is almost impossible, due to channeling, to completely and evenly wash the deposited solids without the use of undue amounts of solvent extractive material.

The use of undue amounts of solvent extractives in the case of compounds that are even slightly soluble in the solvent results in undesired contamination of the filtrate where the filtrate contains the desired purified products, or loss of material where the separated solids are the desired product.

Unevenness of size in precipitation or crystallization frequently gives masses that can be filtered only with great difficulty due to the fact that by segregation they form dense deposits on the filtering surface that are practically impervious to the passage of liquids. Attempts to prevent this dense deposit of separated small particles have been made by designing filters of the revolving leaf type, such as the Oliver and Vallez, where the rotation of the leaf is supposed to result in even deposition of the filtering material. Presses of this type, however, are not of the wash type and cannot be used for this purpose. The ordinary wash filter of the plate and frame type does not permit of an even distribution of the washing media, and parts of the mass are overwashed and parts are decidedly underwashed.

In the case of many types of precipitates which are difficult to wash, it has been found advantageous to stir the mixture under filtration sufficiently to prevent any substantial deposition on the filter blankets, and when the material under filtration is sufficiently thickened, then introducing the wash solvent while maintaining the precipitate in suspension. When the washing is completed, the precipitate is removed from the filter in a slurry which is filtered in a plate and frame type filter to the desired percentage of solids, or is dried directly to the desired state of dryness in a drier, advantageously, of the spray type.

Figure 2:
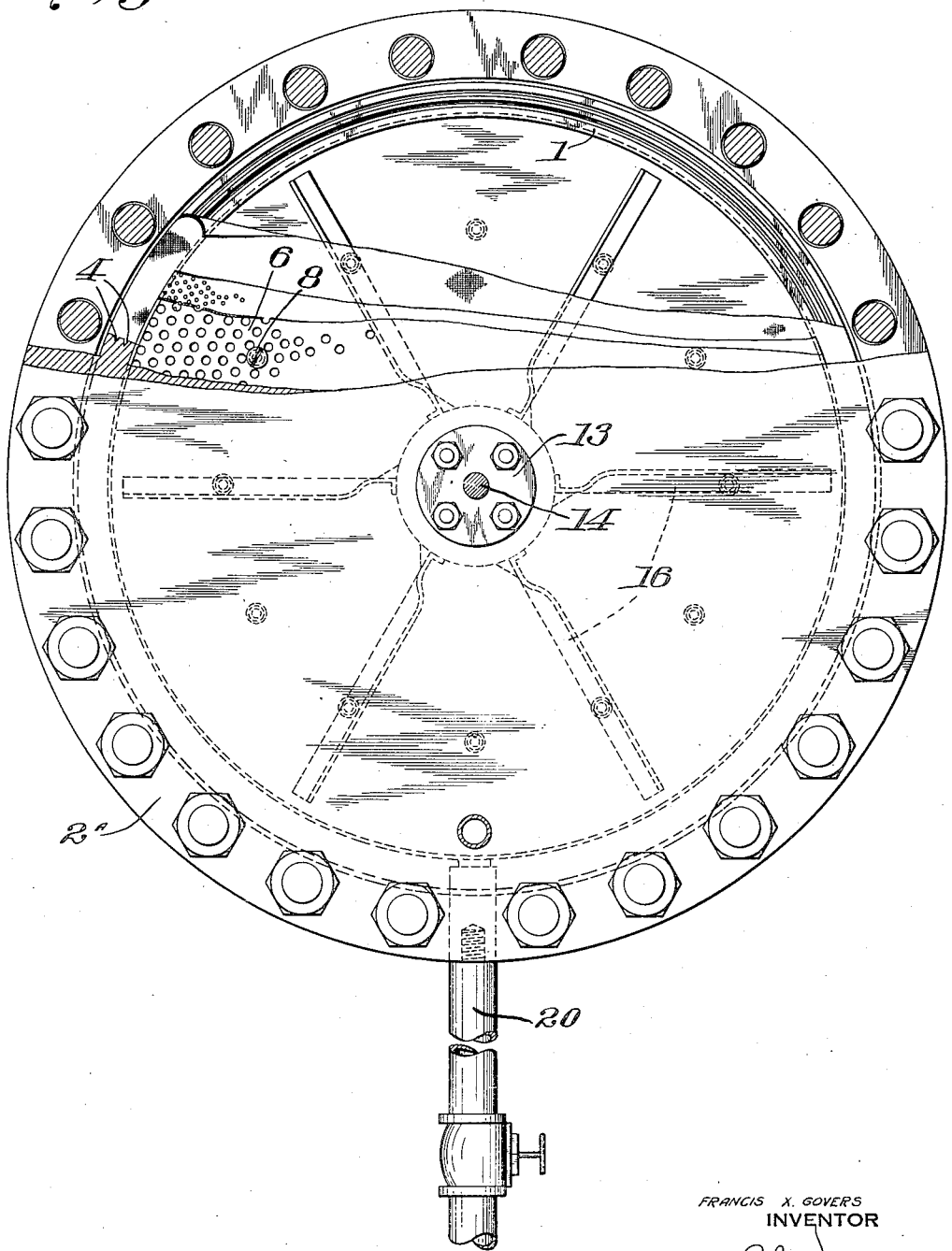

In order to describe the invention, reference will now be made to the figures of the accompanying drawings forming a part of this specification in which:

Fig. 1 is a view of the filter and its connections with a portion of the shell cut away to illustrate the interior thereof, and Fig. 2 is a view of the interior of the filter taken along the line 2—2 of Fig. 1.

In Figs. 1 and 2, the filter comprises a cylindrical body portion 1 and two circular end plates, 2a and 2b, forming the ends of the cylindrical body portion and clamped in position with bolts 3 extending through corresponding holes at regular intervals around the peripheral edges of the plates. Corresponding grooves 4 are provided in the ends of the body 1 and the portion of the inner faces of the plates 2a and 2b contiguous thereto, in which packing or gasket material may be inserted. Instead of employing gasket material, these contiguous edges may be ball-jointed in order to make a leakproof joint.

The inner and adjacent faces of the plates 2a and 2b are cut away to form circular recesses 5 having substantially the same diameter as the internal diameter of the body portion 1.

A grid 6 extends across the recesses of both plates spaced a short distance therefrom by a spacer 7 and secured to the plates by screws 8. Filter cloth, or other fabric material suitable as a filtering surface, is laid over the grid and advantageously secured in position by having its outer edge clamped between the ends of the body portion 1 and the plates 2a and 2b and with its inner edges secured to the central portion of the plates by clamps 9.

The center of each plate 2a and 2b is drilled to provide bearings 10 and 11. The bearing 10 extends all the way through the center of the plate 2a, while bearing 11 advantageously extends only part way through the plate 2b. A stuffing box 12 is rigidly secured to the outer side of the plate 2a, adjacent to the bearing 10 forming a part of the bearing and provided with a packing gland 13. A shaft 14 extends through the stuffing box 12 and is rotatably supported within the bearings 10 and 11. Suitable driving means such as a motor may be provided for rotating the shaft at any desired speed.

Mounted on the shaft 14, and rigidly secured thereto, between the plates 2a and 2b, is a hub 15. A plurality of stirring arms 16 extending radially outwards from the hub are secured thereto at regular intervals about the hub.

While these stirring arms are shown to be of V shaped cross-section, they may be of any suitable shape. Although not shown in the drawings, an advantageous form of construction may comprise stirring arms of flat section adjustably mounted upon the hub 15 and also adapted to be set so that their faces will form different angles with respect to the axis of the hub 15. In this way, the position of the stirring arms may be altered to permit varying the clearance between the edges of the stirring arms and the adjacent filtering surfaces.

Although the drawings illustrate a filter shell having a single pair of filter spaces with the spaces and filtering elements forming the filter shell, it is contemplated that the filter could comprise a plurality of such filtering elements and spaces provided with a plurality of stirring arms, or the filter may comprise an independent drum or shell containing one or more hollow filter leaves supported therein and having revolving stirring arms mounted between such pair of leaves. While stationary filter surfaces have been described, it is contemplated that my invention may be advantageously applied to a filter having rotating leaves.

In the operation of the filter as, for example, in connection with a process for the separation of wax from hydrocarbon oils, a chilled mixture consisting of wax-bearing mineral oil and a solvent liquid, which latter may comprise, for example, 65% of benzol and 35% of acetone, is introduced to the space between the filtering surfaces through a pipe 17 leading from a chilling tank or other source of supply not shown.

The filtrate passes through the filtering surface into the recessed portions 5 from which it is withdrawn through a pipe 18. Wax or solid hydrocarbons contained or suspended in the mixture introduced to the filter is deposited on the surface of the filter cloth. During filtration, the shaft 14 with the stirring arms 16 attached thereto is rotated, usually at a slow rate of speed, say about 10 R. P. M., in order to keep the solid hydrocarbons in suspension in the liquid hydrocarbons until deposited upon the filtering surface.

When a cake of desired thickness has been formed, a quantity of fresh chilled solvent mixture may be introduced to the interior of the filter through a pipe 19 to wash out any mother liquor adhering to the cake. During this washing step, the operation of the stirring mechanism is continued.

Upon completion of the washing of the cake, the filtrate discharge pipe 18 is closed and chilled solvent liquid is introduced until the filter is entirely filled. The speed of the rotating arms is then increased to a relatively high rate, say until about 80 R. P. M. is reached. Due to the violently turbulent condition thus produced within the filter, the cake is dislodged from the filtering surface and converted into a slurry which is then discharged from the filter through a pipe 20.

This slurry may be filtered in a plate and frame type press or advantageously in a Vallez type press while in a chilled condition to remove the greater portion of solvent, and the remainder then evaporated or the whole of the solvent may be recovered by distillation.

If desired, a displacing medium, such as gas under pressure or any other suitable fluid means, may be introduced to the filter through a pipe 21 to facilitate discharging the filter cake slurry from the filter.

In a dewaxing operation of this nature it is, of course, of advantage to confine the filter apparatus within an enclosed region maintained at a low temperature.

As another example, a mixture of mother liquor and precipitated Blanc Fixe produced in any manner customary in the art is introduced into the space between the filtering surface through a pipe 17 while maintaining the precipitate in the mixture in a state of suspension by revolving the stirrer at a rate sufficient to prevent deposition on the blanket, say at 80 R. P. M. When the mixture is sufficiently thickened, which can be determined by the resistance to the stirring arms, water is introduced through pipe 19 and kept running until the wash water filtrate shows no tests for or only slight traces of soluble salts. The slurry is then run to a spray dryer and dried to the desired state of dryness or may be run to a plate and frame type filter and pressed to the desired dryness. Water plus desired chemicals may be used as a preliminary wash in the filter to take out undesired impurities insoluble in plain water.

Obviously many modifications and variations of the invention, as hereinbefore set forth, may be made without departing from the spirit and scope thereof, and therefore only such limitations should be imposed as are indicated in the appended claims.

I claim:

1. In the method of removing solid paraffin from hydrocarbon oil by filtration under pressure at low temperature, the steps comprising mixing the oil with acetone and benzol in proportions sufficient to exert a selective action as between oil and wax at temperatures of the order of 0° F., chilling the mixture to solidify the wax constituents, introducing the mixture of oil and solvent containing solid hydrocarbons to a closed zone of filtration, subjecting the mixture to moderate stirring within said zone sufficient to substantially prevent gravity settling of solids from the filtering solution, removing the mother liquor of liquid hydrocarbons and solvent as a filtrate and forming a filter cake of solid hydrocarbons, stopping the flow of cold mixture to the filtration zone when a cake of desired thickness is formed, introducing fresh acetone and benzol mixture as a washing liquid to the zone of filtration to displace the remaining mother liquor and to wash the cake, removing the wash solution, thereafter filling said zone of filtration with acetone and benzol mixture, subjecting the solvent to relatively more rapid and violent stirring to thereby dislodge the filter cake and form with the solvent a slurry, and withdrawing the slurry from said zone of filtration.

2. In the method of removing solid paraffin from hydrocarbon oil by filtration under pressure at low temperature, the steps comprising mixing the oil with a selective solvent having the essential selective action of a mixture of 35% acetone and 65% benzol as between wax and oil, chilling the mixture to solidify the wax constituents, introducing the mixture of oil and solvent containing solid hydrocarbons to a closed zone of filtration, subjecting the mixture to moderate stirring within said zone sufficient to substantially prevent gravity settling of solids from the filtering solution, removing the mother liquor of liquid hydrocarbons and solvent as a filtrate and forming a filter cake of solid hydrocarbons, stopping the flow of cold mixture to the filtration zone when a cake of desired thickness is formed, introducing fresh selective solvent mixture as a washing liquid to the zone of filtration to displace the remaining mother liquor and to wash the cake, removing the wash solution, thereafter filling said zone of filtration with the selective solvent mixture, subjecting the solvent to relatively more rapid and violent stirring to thereby dislodge the filter cake and form with the solvent a slurry, and withdrawing the slurry from said zone of filtration.

FRANCIS X. GOVERS.